(12) United States Patent
Steimer et al.

(10) Patent No.: US 11,530,717 B2
(45) Date of Patent: Dec. 20, 2022

(54) FASTENING DEVICE FOR FASTENING A COMPONENT TO A CARRIER COMPONENT

(71) Applicant: ILLINOIS TOOL WORKS INC., Glenview, IL (US)

(72) Inventors: Thomas Steimer, Saulheim (DE); Francisco Criado, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 30 days.

(21) Appl. No.: 17/227,606

(22) Filed: Apr. 12, 2021

(65) Prior Publication Data

US 2021/0324892 A1  Oct. 21, 2021

(30) Foreign Application Priority Data

Apr. 16, 2020 (DE) ...................... 10 2020 110 407.3

(51) Int. Cl.
*F16B 13/02* (2006.01)
*B60R 21/20* (2011.01)

(52) U.S. Cl.
CPC .............. *F16B 13/02* (2013.01); *B60R 21/20* (2013.01)

(58) Field of Classification Search
CPC ...... F16B 13/02; F16B 21/065; F16B 5/0607; F16B 21/06; F16B 5/126; F16B 19/1081; F16B 21/086; B60R 21/20; B60R 11/02
See application file for complete search history.

(56) References Cited

U.S. PATENT DOCUMENTS

| 7,219,400 | B2 * | 5/2007 | Tashima | F16B 5/0642 24/453 |
| 7,226,023 | B2 * | 6/2007 | Banno | F16B 21/088 24/453 |
| 7,669,807 | B2 * | 3/2010 | Stigler | F16B 21/086 248/231.9 |
| 7,841,817 | B2 * | 11/2010 | Kawai | F16B 19/1081 411/41 |

(Continued)

FOREIGN PATENT DOCUMENTS

DE 10255902 A1 6/2003
DE 102004025698 A1 12/2005

(Continued)

*Primary Examiner* — Robert Sandy
*Assistant Examiner* — Louis A Mercado
(74) *Attorney, Agent, or Firm* — Thompson Hine LLP

(57) ABSTRACT

A fastening apparatus for fastening a component to a carrier component includes a housing device having a receiving recess, at least one actuating element and at least one latching element for latching in a carrier component, and a pin device which can be arranged so as to be displaceable in the receiving recess of the housing device in an assembly direction and which has at least one movable pin arm with a pin latching structure for transmitting an assembly force, which acts in the assembly direction, to a rigid housing latching structure which is integrally formed on the housing device, in order preferably to arrange the fastening apparatus in an intermediate assembly position, wherein the housing latching structure is formed in a corresponding manner to the pin latching structure, and wherein the actuating element is designed to actuate the at least one pin arm.

11 Claims, 6 Drawing Sheets

(56) References Cited

U.S. PATENT DOCUMENTS

| | | | | |
|---|---|---|---|---|
| 8,043,038 B2* | 10/2011 | Sano | ............... | F16B 19/1081 |
| | | | | 24/297 |
| 8,695,177 B2* | 4/2014 | Kato | ............... | F16B 21/065 |
| | | | | 24/297 |
| 8,696,018 B2* | 4/2014 | Yamamoto | ........... | B60R 21/217 |
| | | | | 280/728.2 |
| 9,115,743 B2* | 8/2015 | Yamamoto | ........ | F16B 19/1081 |
| 9,132,789 B2* | 9/2015 | Suzuki | ............. | F16B 19/1081 |
| 9,145,909 B2* | 9/2015 | Lepper | ............... | F16B 21/082 |
| 9,333,554 B2* | 5/2016 | Kanie | ................ | B21J 15/041 |
| 10,018,214 B2* | 7/2018 | Yon | .................. | F16B 5/065 |
| 10,221,873 B2* | 3/2019 | Flynn | ............... | F16B 5/0628 |
| 10,443,633 B2* | 10/2019 | Scherer | ............ | F16B 21/065 |
| 10,914,336 B2* | 2/2021 | Edland | .............. | F16B 21/086 |
| 10,927,871 B2* | 2/2021 | Criado del Pino | ..... | F16B 13/04 |
| 11,078,944 B2* | 8/2021 | Lepper | ............... | F16B 21/073 |
| 11,365,753 B2* | 6/2022 | Lee | .................. | F16B 5/065 |
| 2010/0329815 A1* | 12/2010 | Jackson, Jr. | ........ | F16B 19/1081 |
| | | | | 411/357 |
| 2014/0341674 A1* | 11/2014 | Hirano | .............. | F16B 19/1081 |
| | | | | 411/80.1 |
| 2015/0300388 A1 | 10/2015 | Maschat | | |
| 2017/0009789 A1 | 1/2017 | Scherer | | |
| 2021/0381536 A1* | 12/2021 | Criado Del Pino | .. | F16B 5/0628 |
| 2021/0394696 A1* | 12/2021 | Yamamoto | ............. | B60R 21/20 |

FOREIGN PATENT DOCUMENTS

| | | |
|---|---|---|
| DE | 60126229 T2 | 11/2007 |
| DE | 102010034006 A1 | 2/2012 |
| DE | 102014101119 A1 | 7/2015 |
| DE | 102018006297 A1 | 2/2020 |

* cited by examiner

FASTENING DEVICE FOR FASTENING A COMPONENT TO A CARRIER COMPONENT

TECHNICAL FIELD

The present invention relates to a fastening apparatus for fastening a component, in particular an airbag, to a carrier component.

BACKGROUND

DE 10 201 0034 006 A1 discloses the provision of a fastening clip having a spring clamp, which is provided for latching in a carrier, and having a bolt, which is provided for locking the spring clamp in the carrier. The spring clamp has at least one latching element which is movable elastically between a starting position, an intermediate assembly position and an assembly position. The bolt has at least one securing element which interacts with the latching element in such a way that the bolt can be displaced from a starting position into a locking position only when the latching element is situated in the assembly position. With the spring clamp in the nonassembled state, the latching element of the spring clamp is situated in an unloaded position, which is defined here as the starting position. While the spring clamp is being inserted into a carrier, the spring elements are pushed away from the edge of the opening such that they can be displaced into a preloaded intermediate assembly position. With the spring clamp in the completely inserted state, the latching elements latch on the carrier in an assembly position. Depending on the shape of the carrier, this assembly position can also correspond to the starting position. The bolt serves to fix the latching elements of the spring clamp after the fastening clip has been mounted in the assembly position, with the result that disassembly of the fastening clip is possible only with very high pull-out forces, if at all. In order to prevent a situation in which the bolt is inserted into the spring clamp prior to assembly, the bolt has a securing element which interacts with the latching element in such a way that insertion of the bolt into the spring clamp is prevented both in the starting position and in the intermediate assembly position. It is only when the spring clamp has been completely mounted and the latching elements are latched in the assembly position that the bolt is released such that insertion of the bolt into the locking position is possible. Premature insertion of the bolt is thus reliably ruled out. On the other hand, a visual inspection can occur as to whether the fastening clip has been completely mounted since, in the case of the fastening clip not being correctly mounted, insertion of the bolt is not possible, with the result that the bolt projects out of the spring clamp.

DE 102 018 006 297 A1 discloses a multipart clip for fastening one element to another element. The clip comprises a first component and a securing means, wherein the first component has a head and a shank which extends away from the head along a shank axis and which has a tip, wherein the shank has a basic body and a latching element, wherein the latching element has a contact surface facing away from the tip, and the head has a contact surface facing the tip, wherein the latching element is movable between a first position and a second position, wherein part of the latching element projects out of the basic body of the shank in the first position, and, in the second position, the latching element either projects out of the basic body less than in the first position or does not project out of the basic body at all, wherein the basic body of the shank has provided therein a checking region in which no portion of the latching element is situated when the latching element is situated in the first position, and in which a portion of the latching element is situated when the latching element is in the second position, wherein the securing means has an outer part which is provided to remain outside of the component, and has an inner part which can be inserted into the basic body in an insertion direction up to an end position, wherein the inner part has a securing pin which has a portion which reaches into the checking region when the inner part is inserted up and into the end position, and the securing pin has a lug which extends at an angle to the insertion direction and which engages through an opening in the basic body in an intermediate position, in which the inner part is partially inserted into the basic body, but has not yet reached the end position, and comes into contact with an edge of the opening, with the result that a further insertion of the securing means beyond the intermediate position is prevented, wherein the lug can be pressed in the direction of the interior of the basic body to such an extent that further insertion of the securing means beyond the intermediate position can occur, characterized in that, in the intermediate position, the securing pin does not contact a latching element situated in the first position.

Such fastening apparatuses are additionally known from US 2015/0300388 A1, DE 601 26 229 T2 or DE 102 55 902 A1. They serve to fasten components in a vehicle.

SUMMARY

An object of the present invention is to provide a fastening apparatus which is secure and reliable in operation.

A further object of the present invention is that of providing an integrated assembly verification means that is to be actuated in a simple manner and without auxiliary means.

One or more of these objects is achieved by a fastening apparatus as is defined in independent patent claim 1. Advantageous embodiments are specified in the dependent claims, which are dependent thereon.

According to the invention, a fastening apparatus for fastening a component to a carrier component is provided. It comprises a housing device having a receiving recess, at least one actuating element and at least one latching element for latching in a carrier component, and a pin device which can be arranged so as to be displaceable in the receiving recess of the housing device in an assembly direction and which has at least one movable pin arm with a pin latching means for transmitting an assembly force, which acts in the assembly direction, to a rigid housing latching means which is integrally formed on the housing device, in order preferably to arrange the fastening apparatus in an intermediate assembly position, wherein the housing latching means is formed in a corresponding manner to the pin latching means, and wherein the actuating element is designed to actuate the at least one pin arm.

The invention preferably relates to a fastening apparatus which can be used for fastening an airbag in a vehicle.

For this purpose, the housing device of the fastening apparatus is plugged through an opening in an airbag and then inserted into a component opening in a carrier component. The pin device is then subjected to a force acting in the assembly direction.

The invention is distinguished, according to a first aspect, by the fact that the at least one movable latching arm of the pin device with the pin latching means transmits the assembly force acting in the assembly direction directly to a rigid housing latching means integrally formed on the housing device, and thus to the housing device. By virtue of the fact that the assembly force occurs first of all only on the housing latching means formed on the housing device and not on movable or flexible components, such as for example latching elements, of the fastening apparatus, they do not have the assembly force acting on them continuously, the result of which can be unintentional jamming or jamming in a component opening, in particular locking of the latching elements. Continuous and process-reliable mounting of a component by means of the fastening apparatus is thereby made possible. Furthermore, the assembly force thus has no influence on a verification function of the fastening apparatus.

Moreover, the fastening apparatus is distinguished, according to a second aspect, by the fact that the actuating element is provided for actuating the at least one pin arm. In this way, the pin arm is not directly actuated by an edge of the component opening, but rather there occurs indirect contacting since the movable pin arm is actuated by means of the actuating element. Such indirect contacting is more process-reliable, since a (surface) characteristic and a (production) quality of the edge of the component opening exerts no direct influence on the function and movability of the pin arms. The intrinsically closed system is thus independent of external factors which can negatively influence the assembly.

In the clip disclosed in DE 102 018 006 297 A1, there is provision that, in the intermediate position, the securing pin does not contact a latching element situated in a first position. As a result, in the intermediate position, the securing pin is decoupled from the latching element in the first position. That is intended to have the advantage that the latching element cannot displace the securing pin when the latching element is moved from the first position into the second position. Nor is it thus possible for the contact between the lug of the securing pin and the edge of the opening in the basic body to be canceled by the latching element. The securing means is intended, in this case, to remain securely in the intermediate position independently of the movement of the latching element. This is intended to be advantageous in a preassembly step in which the latching element is pressed in and the securing means simultaneously remains in the intermediate position. Up until final assembly, in which the securing pin is in the end position, it should be ensured that the securing pin does not unintentionally fall out of the component. A further advantage of this clip is intended to lie in the fact that the latching element is situated in a preassembly state in the second position, but the securing pin remains securely in the intermediate position until it is then brought in a subsequent assembly step into the end position. The absence of the interaction between the latching element and the securing pin, which is situated in the intermediate position, is therefore intended to allow new assembly applications, for example a stepped assembly.

What is problematic with such fastening apparatuses is that swinging out of latching elements behind a carrier component and a more or less simultaneous release of movable arms (for example a lug of a securing pin) from a force-transmitting connection with a housing for transmitting an assembly force has to be coordinated in terms of time in such a way that the fastening apparatus, in particular the latching elements thereof, do not jam in a component opening in a carrier component. In the case of the clip disclosed in DE 102 018 006 297 A1, these two operations need to be very precisely coordinated with one another in terms of time. In the worst case, the lugs of the securing pin could be prematurely released from the housing and thus slide through downward before the latching elements are latched in the carrier component in a process-reliable manner.

Should this not be possible in such a precisely timely manner, the component has to be excessively pressed further in the assembly direction. What happens is that the latching elements then swing out and it is only when the component is pressed further in the assembly direction that the securing pin is subsequently activated by the lugs via the edge of the component opening. This leads to compression of the component to be fastened, for example an airbag module, and possibly leads to increased assembly force. Expressed in another sense: in order to actuate the lugs of the securing pin by the edge of the component opening, the clip needs to continue to be moved in the assembly direction after the latching elements, in the final assembly position, have been swung out behind the sheet metal of the carrier component.

In the case of the fastening apparatus according to the invention, there is a direct connection and hence a dependency between the pin arms of the pin device and the latching elements, that is to say a pin element of the pin device cannot slip through during transfer from an intermediate assembly position into a final assembly position, since said pin element is blocked by the latching elements but, directly after the latching of the latching elements, the pin element or the pin device transfers into the final assembly position. Consequently, the apparatus according to the invention is extremely process-reliable, and assembly problems are avoided.

According to a further aspect, the pin device can have a rigid pin element, wherein the pin element has a surface which is situated at the front in the assembly direction and which is designed to transmit a force, which acts in the assembly direction, to the at least one latching element of the housing device in order preferably to arrange the fastening apparatus in a final assembly position.

If the pin arms have been swung in by the activating elements after reaching the intermediate assembly position, the assembly force is transmitted via the pin element to the swung-in latching elements. The assembly force transmitted via the pin arms continues to act mainly in the assembly direction (downward) on the latching arms which, however, are held in position by the edge of the component opening and in this way exert a counterforce with respect to the rigid pin element. Nevertheless, a component of the assembly force acts outward at a predetermined angle, with the result that the main force is already effected in the assembly direction in order to reach the final assembly position. At the same time, however, with the final assembly position reached, the swinging out of the latching elements (latching arms) is also ensured by the outwardly acting force component of the assembly force, and hence a process-reliable assembly is additionally ensured. It is thus the case that secure and reliable swinging out and latching of the latching elements is ensured. Moreover, the assembly is facilitated as a result.

According to a further aspect of the present invention, in each case two actuating elements and two latching elements can be formed on the housing device and are arranged on adjacent side walls of the housing device in such a way that the in each case two actuating elements are situated opposite one another and are arranged offset with respect to one another in the assembly direction in such a way that the latching elements are arranged at the front in the assembly direction and the actuating elements are arranged behind them in the assembly direction.

By virtue of the fact that the actuating elements are offset by 90° or are arranged on different side walls of the housing device, and the assembly force is first applied to the rigid housing and then to the latching elements, the force is transmitted securely and reliably in the assembly direction to the latching elements swung in by the edge of the component opening. The advantages specified above apply here analogously.

According to a further aspect of the fastening apparatus according to the invention, it is the case that, in a final assembly position, the pin element can be arranged between the latching elements in such a way that a movement of the latching elements is blocked in the final assembly position, with the result that the fastening apparatus is secured in the final assembly position.

Thus, after reaching a final assembly position, the pin element is arranged in the region between the latching elements and prevents the latter from swinging in. This results in the fastening apparatus being secured in the final assembly position in a secure, reliable manner.

Furthermore, a verification portion which extends transversely to the assembly direction can be provided at an end of the pin device situated counter to the assembly direction and, in the final assembly position, can be arranged completely, preferably areally flush, in a recess of the housing device.

The verification portion of the pin device thus forms, in conjunction with the corresponding recess of the housing device, a verification device by means of which it is possible in a simple manner to determine, visually and haptically, whether the fastening apparatus is correctly arranged or mounted in the final assembly position.

In particular, latching wings having at least one and preferably two preassembly latching means and/or having at least one and preferably two final assembly latching means can be provided on the verification portion, wherein the preassembly latching means fix the housing device and the pin device in a preassembled position relative to one another and/or the final assembly latching means fix the housing device and the pin device in a final assembly position relative to one another.

The provision of the latching wings with at least one and preferably two preassembly latching means results in the pin device and the housing device being fixed relative to one another in a transport/preassembly position. In this way, the pin device is subjected to a force acting in the assembly direction and is secured against being displaced counter to the assembly direction.

Moreover, the transport-securing means of the pin device can be formed by the above-described pin latching means in conjunction with the housing latching means. In this way, the pin device is subjected to a force acting counter to the assembly direction and is secured against displacement in the assembly direction.

Thus, a transport-securing means is formed and the fastening apparatus according to the invention can be delivered as a prefabricated unit such that the latter can be mounted as a unit on a carrier component. Furthermore, a situation is prevented in which the pin device and the housing device of the fastening apparatus are released from one another or in which the pin device falls out of the housing device.

A cause of such falling out can be, for example, forces which act during transport of the preassembled fastening apparatus in such a way that they move the pin device out of the housing device. A further cause can be, for example, the weight force of the pin device.

There can also be provided latching wings having at least one and preferably two final assembly latching means which fix the pin device and the housing device relative to one another in their final assembly position. It is ensured in this way that the fastening apparatus cannot be released from the carrier component and, in particular, an airbag can be securely and reliably mounted by means of the fastening apparatus.

Moreover, a stop element having a stop surface for limiting a displacement of the pin device in the receiving recess of the housing device in the assembly direction can be formed on the pin device, wherein a corresponding counter-stop surface is formed on the housing device.

The stop surface for limiting a displacement of the pin device in the receiving recess of the housing device and the corresponding counter-stop surface formed on the housing device prevent a situation in which the pin device is inserted too far into the housing device. In addition, the user receives haptic feedback indicating that the pin device no longer has to be subjected to a force acting in the assembly direction, with the result that the latching elements can swing out and the fastening apparatus is latched in the carrier component.

The housing device and the pin device can preferably be formed from one and the same plastic or from two different plastics. The plastics provided may be thermoplastic materials, such as for example polyamide (PA) or polyoxymethylene (POM).

The fact that the fastening apparatus is formed completely from plastic means that it can be produced simply and cost-effectively.

Moreover, the housing device can have a fastening surface which extends transversely to the assembly direction in order to fix a fastening portion of a component to be fastened, preferably an airbag, between the fastening surface and a surface, which extends parallel to the fastening surface, of a carrier component.

At least one spring element can be provided in the region of the fastening surface in order to apply a spring force acting in the assembly direction to the component, which is to be fastened, in the final assembly position.

The application of the spring force acting in the assembly direction to the component to be fastened ensures that the component to be fastened is arranged in a positionally accurate manner.

Also provided according to the invention is a method for introducing the fastening apparatus into a component opening in a carrier component or for transferring it from a transport/preassembly position via an intermediate assembly position into a final assembly position.

This method will be described below in detail on the basis of the exemplary embodiment.

The advantages of the present invention that have been specified above on the basis of the fastening apparatus apply analogously to the method according to the invention.

BRIEF DESCRIPTION OF THE DRAWINGS

The present invention will be described in more detail below on the basis of an exemplary embodiment illustrated in the figures, in which.

DETAILED DESCRIPTION

Figure 1:
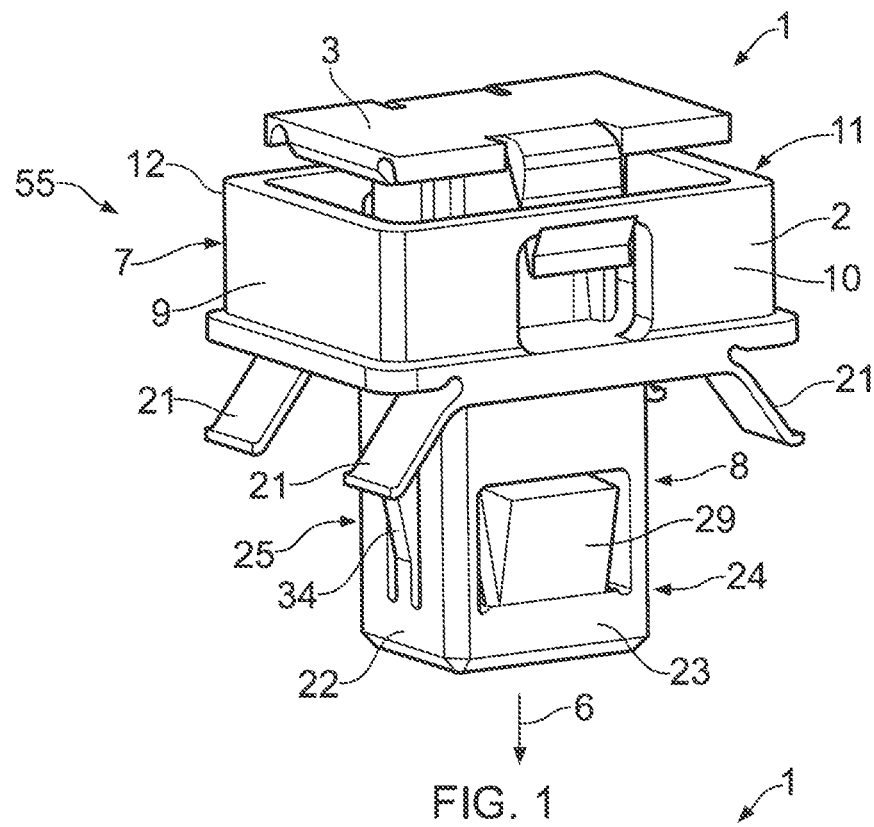
FIG. 1 shows a perspective illustration of a fastening apparatus according to the invention in a preassembly position or in a transport position.
Figure 2:
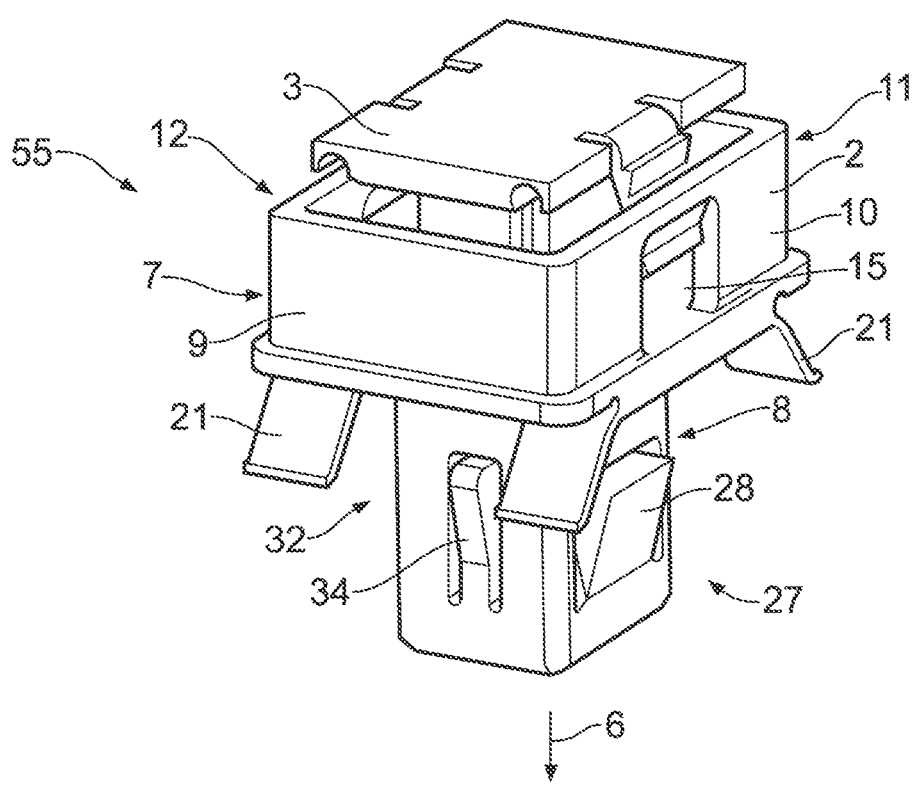
FIG. 2 shows the fastening apparatus from FIG. 1 in a further perspective illustration.
Figure 3:
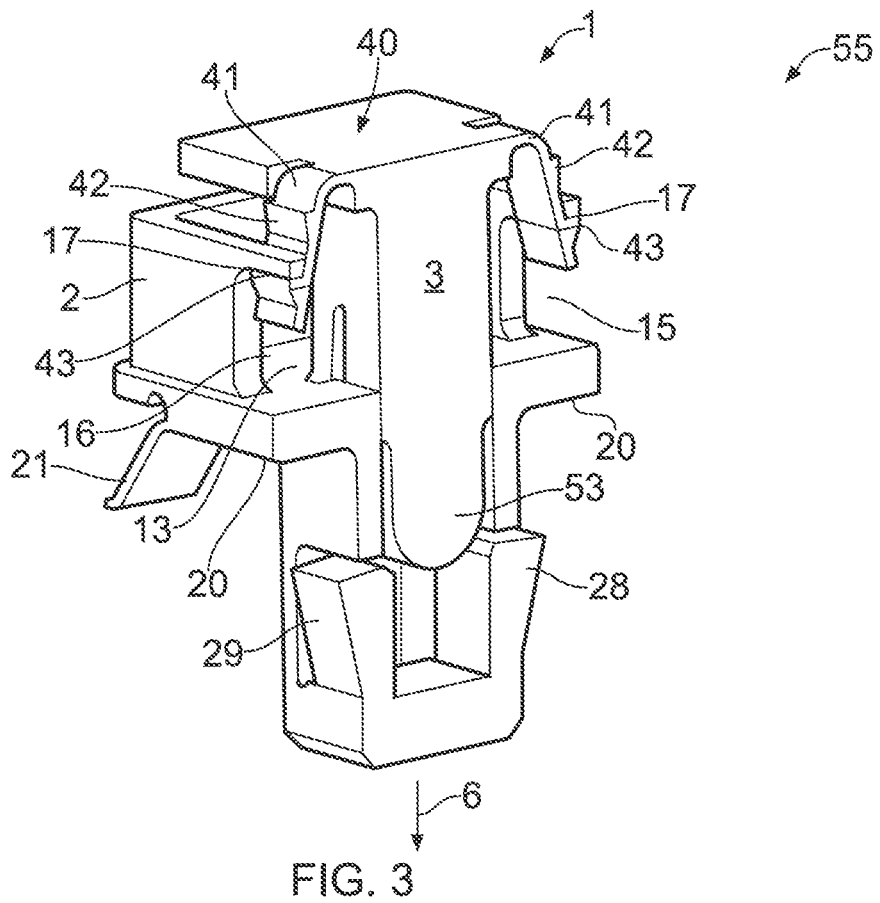
FIG. 3 shows a laterally sectioned perspective illustration of the fastening apparatus in a preassembly position.
Figure 4:
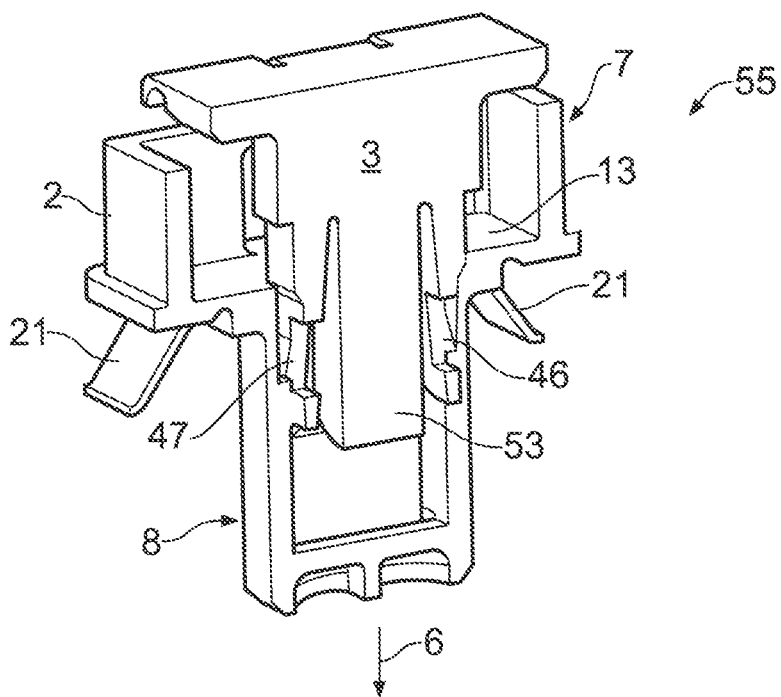
FIG. 4 shows a further laterally sectioned perspective illustration of the fastening apparatus in a preassembly position.
Figure 5:
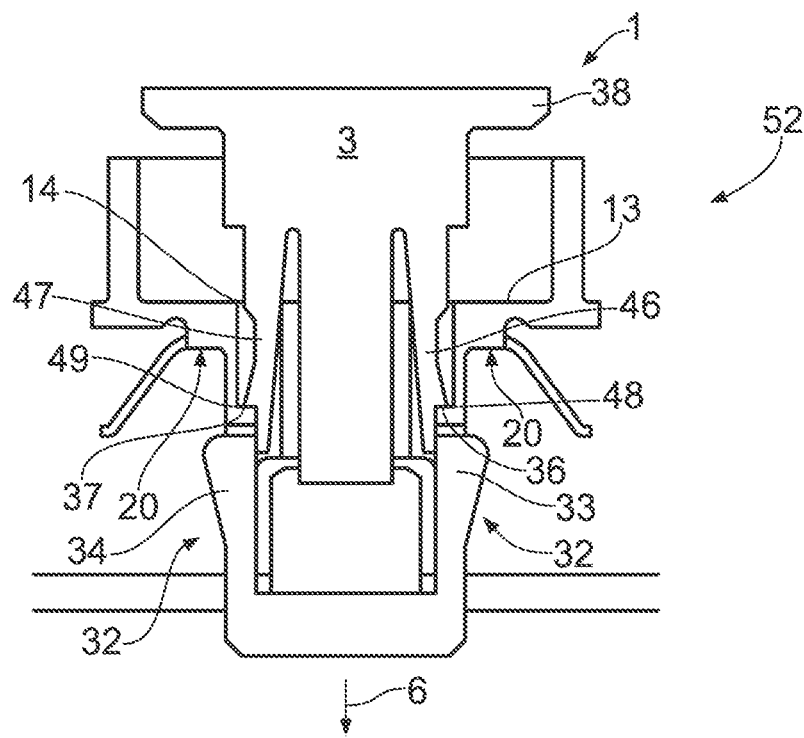
FIG. 5 shows a laterally sectioned illustration of the fastening apparatus in a preassembly position.
Figure 6:
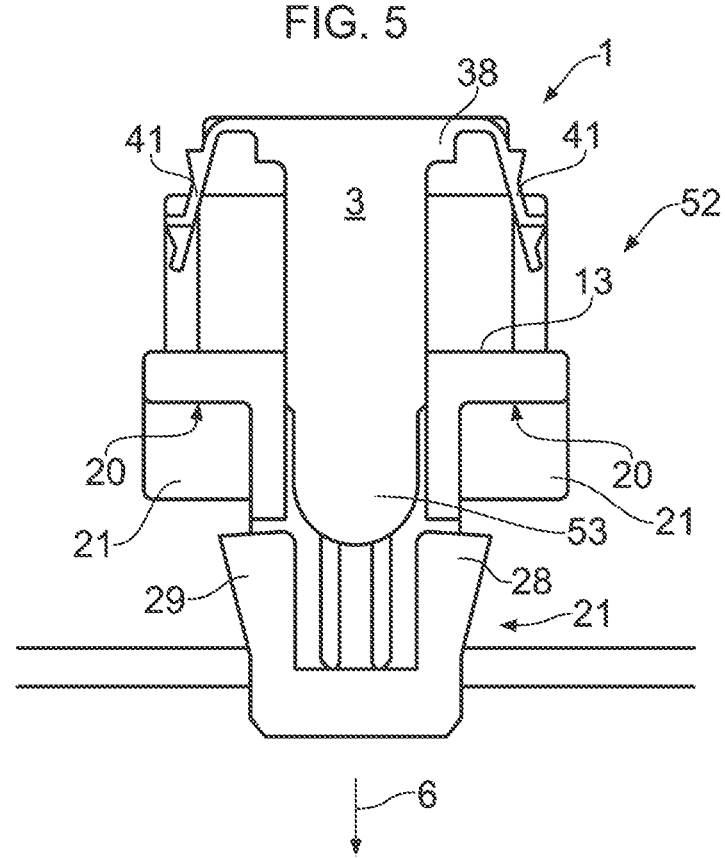
FIG. 6 shows a further laterally sectioned illustration of the fastening apparatus in a preassembly position.
Figure 7:
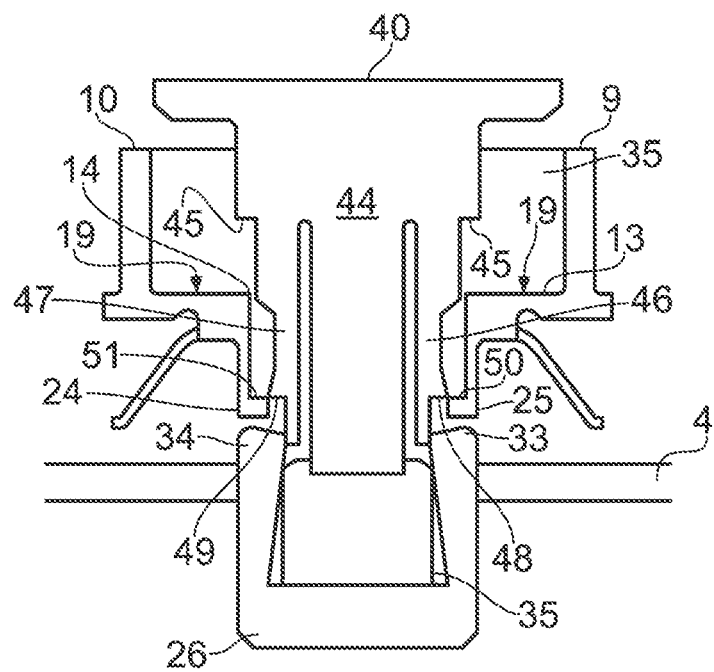
FIG. 7 shows a laterally sectioned illustration of the fastening apparatus during the transfer from a preassembly position into an intermediate assembly position.
Figure 8:
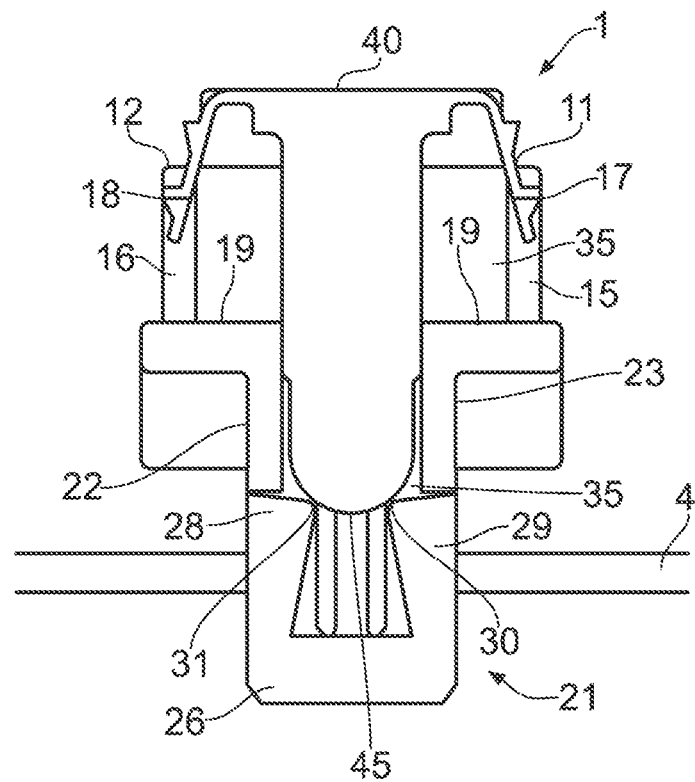
FIG. 8 shows a laterally sectioned illustration of the fastening apparatus during the transfer from the intermediate assembly position into a final assembly position.
Figure 9:
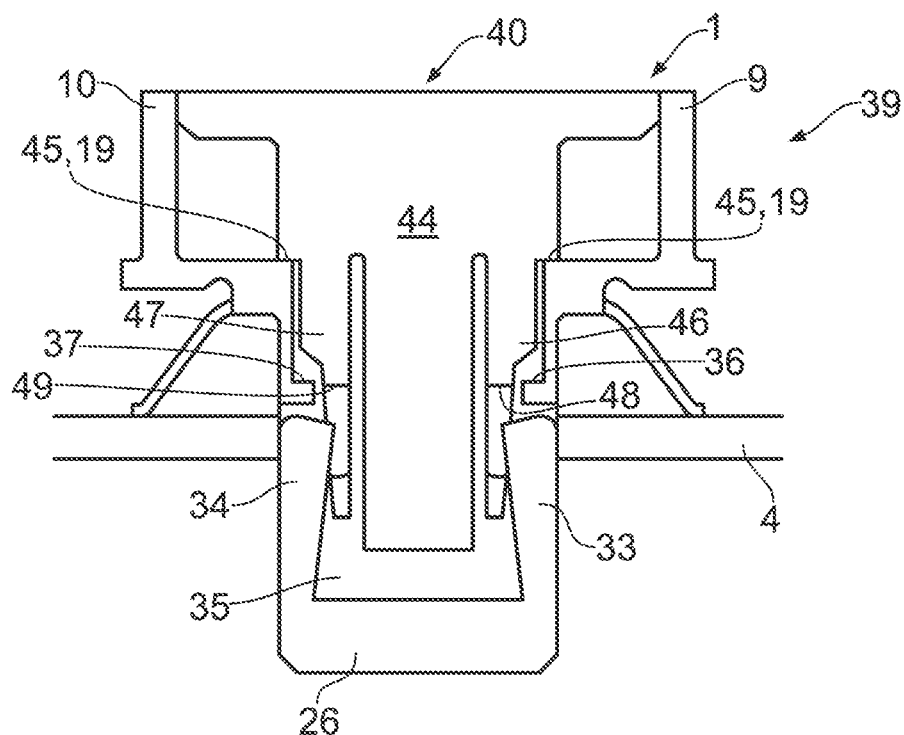
FIG. 9 shows a laterally sectioned illustration of the fastening apparatus in the final assembly position.
Figure 10:
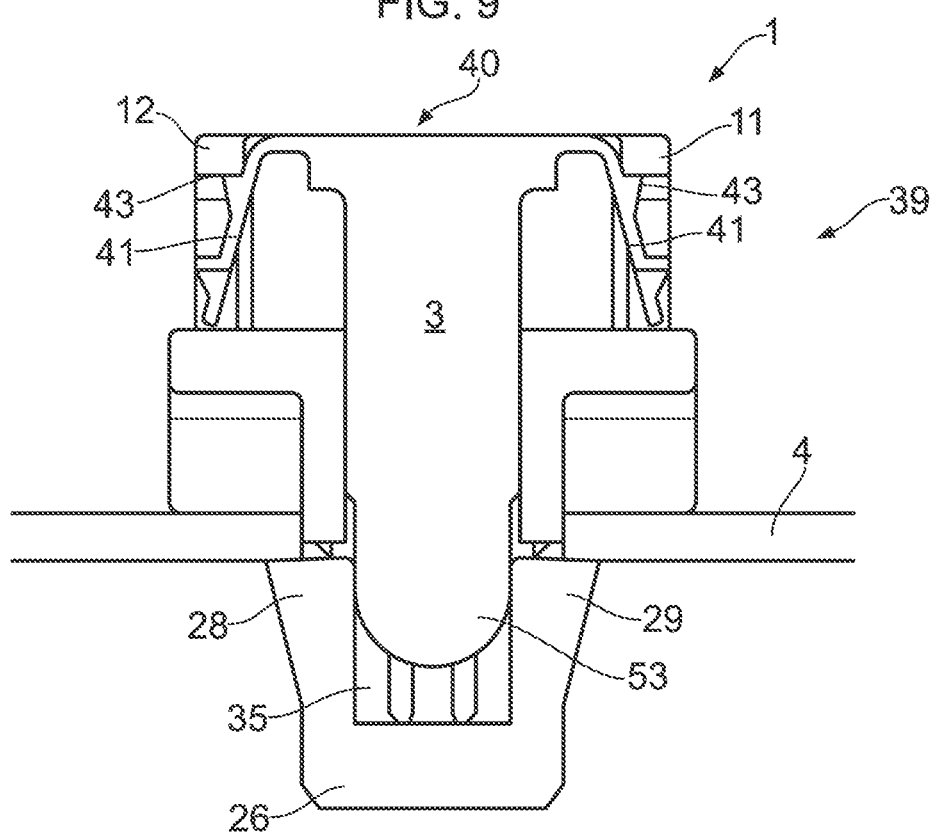
FIG. 10 shows a laterally sectioned illustration of the fastening apparatus in a final assembly position.
Figure 13:
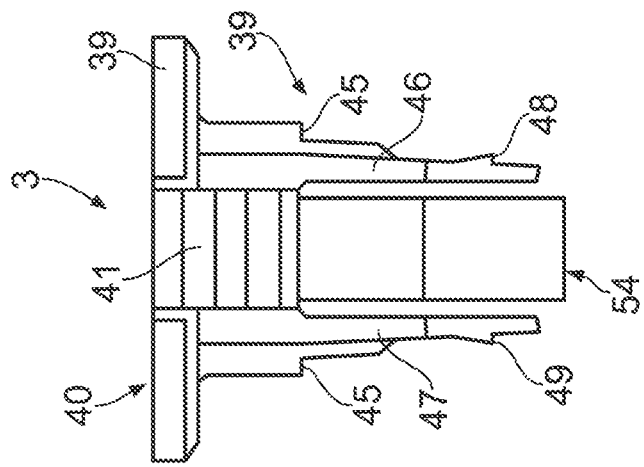
FIG. 13 shows a lateral view of the pin device in the final assembly position.
Figure 12:
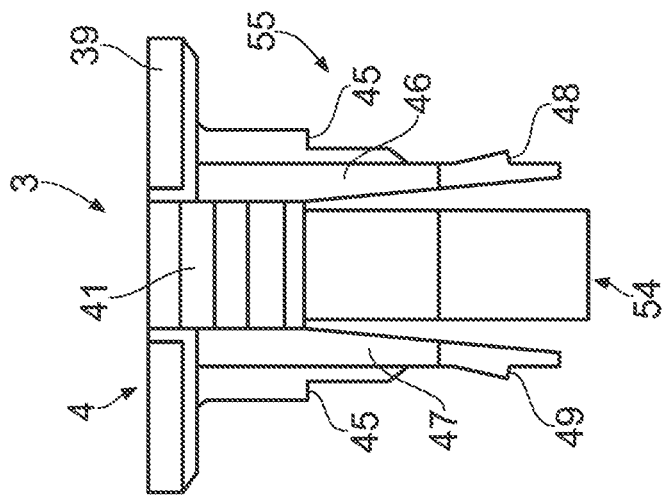
FIG. 12 shows a lateral view of the pin device in the preassembly position.
Figure 11:
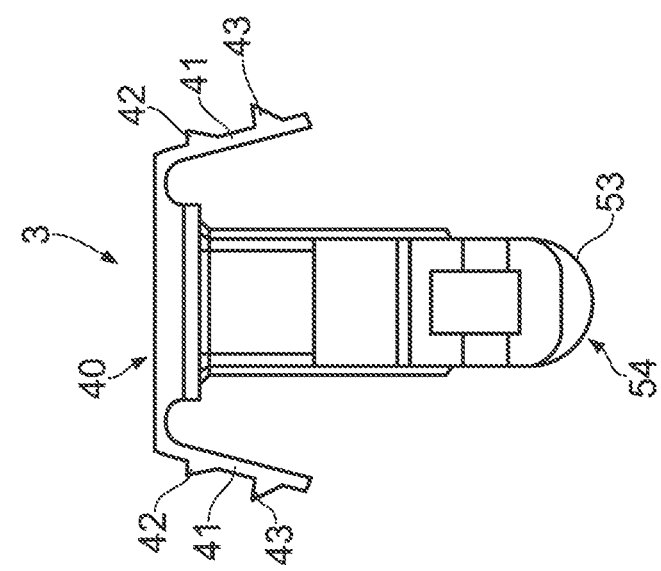
FIG. 11 shows a lateral illustration of a pin device of the fastening apparatus.

A fastening apparatus 1 according to the invention for fastening a component, preferably an airbag, to a carrier component 4 comprises a housing device 2 and a pin device 3 (FIGS. 1 to 13).

The fastening apparatus 1 is designed for fastening a component (not shown) to a carrier component 4. The carrier component 4 has a corresponding component cutout 5 in which the fastening apparatus 1 can be fixed. The fastening apparatus 1 can be introduced into the component opening in an assembly direction 6 extending transversely to a component surface of the carrier component 4.

The housing device 2 of the fastening apparatus 1 is approximately T-shaped in form as seen in a side view, wherein the housing device 2 comprises a verification portion 7 and a fastening portion 8.

The verification portion 7 is approximately box-shaped in form and comprises four side walls 9, 10, 11, 12 and also a bottom wall 13. The four side walls 9, 10, 11, 12 and the bottom wall 13 are constituent parts of a receiving recess 35 of the verification portion 7.

In the bottom wall 13 there is formed a receiving opening 14 for receiving the pin device 3.

On two mutually opposite side walls 9, 10, 11, 12 of the fastening region there are formed latching cutouts 15, 16 in the form of through-openings which have latching edges 17, 18 extending in the horizontal direction.

A surface of the bottom wall 13 of the box-shaped verification region 7 that faces counter to the assembly direction 6 forms a counter-stop surface 19. A surface of the bottom wall 13 that faces in the assembly direction 6 forms a fastening surface 20 for fixing a component to be fastened.

Integrally formed in the region of corners of the fastening surface 20 are four spring elements 21 in order to apply a spring force acting in the assembly direction 6 to the component to be fastened.

The fastening portion 8 is approximately parallelepipedal in form and transitions, in the region of the receiving opening 14, into the verification portion 7 and extends in the assembly direction 6.

The fastening portion 8 has four side walls 22, 23, 24, 25 and has a bottom wall 26 situated at the front in the assembly direction.

In a latching region 27 of the fastening portion 8 that is situated at the front in the assembly direction 6 there are arranged approximately wedge-shaped latching elements 28, 29 in two mutually opposite side walls 22, 23.

The wedge-shaped latching elements 28, 29 are connected in an articulated manner, by way of their edges situated at the front in the assembly direction and extending transversely to the assembly direction 6, to the corresponding side walls 22, 23, 24, 25 of the housing device 2 in such a way that they are designed to be pivotable approximately transversely to the assembly direction 6. Furthermore, the latching elements 28, 29 have latching/force transmission surfaces 30, 31 extending approximately transversely to the assembly direction.

In the region between the latching region 27 and the verification portion 7, an actuating region 32 is provided on the fastening portion 8.

Actuating elements 33, 34 are provided in the actuating region 32 in the region of two mutually opposite side walls 24, 25 and adjacent to the latching elements 28, 29.

The actuating elements 33, 34 are approximately wedge-shaped in form and are connected in an articulated manner, by way of their edges situated at the front in the assembly direction 6, to the corresponding side walls 24, 25 of the fastening portion 8. Similarly to the latching elements 28, 29, the actuating elements 33, 34 are able to be displaced or tilted approximately transversely to the assembly direction 6.

The side walls 22, 23, 24, 25 of the fastening portion 8 delimit, in conjunction with the bottom wall 6, the receiving recess 35 of the housing device 2.

In a region of the receiving recess 35 that is situated counter to the assembly direction 6, housing latching means 36, 37 in the form of a step are formed in the region of the actuating elements 33, 34.

In the text which follows there will be given a more detailed description of the pin device 3 which can be displaced in the receiving recess 35 and in the assembly direction 6.

The pin device 3 is likewise approximately T-shaped in form and has a plate-shaped verification element 38 which extends approximately transversely to the assembly direction. In a final assembly position 39, the verification element 38 can be arranged areally flush in the box-shaped verification portion 7 of the housing device 2 in such a way that a verification surface 40 situated counter to the assembly direction terminates flush with the edges, situated counter to the assembly direction, of the side walls 9, 10, 11, 12 of the verification portion 7.

Moreover, latching wings 41 having in each case a preassembly latching means 42 and a final assembly latching means 43 are integrally formed on the verification element on two mutually opposites edges.

A parallelepipedal stop element 44 is integrally formed on a surface of the verification element 38 that is situated at the front in the assembly direction 6.

A surface of the stop element 44 that is situated at the front in the assembly direction 6 forms a stop surface 45 for limiting a displacement of the pin device 3 in the assembly direction. The stop surface 45 is provided for butting against the counter-stop surface 19 of the housing device 2.

Pin arms 46, 47 which are displaceable transversely to the assembly direction 6 and which extend approximately in the assembly direction 6 are provided on the stop element 4. Pin latching means 48, 49 extending approximately transversely to the assembly direction 6 are formed on the pin arms 46, 47.

The pin latching means 48, 49 are provided for transmitting a force, which acts on the pin device 3 in the assembly direction 6, via the housing latching means 36, 37 to the housing device 2. In this way, the fastening apparatus 1 can be displaced in the assembly direction until reaching an intermediate assembly position 52.

The pin arms 46, 47 can be displaced transversely to the assembly direction 6 by means of the actuating elements 33, 34 of the housing device 2.

In the region between the pin arms 46, 47, a pin element 53 extending in the assembly direction is provided on the stop element 44.

The pin element extends in the assembly direction 6 beyond the free ends of the pin arms 46, 47 and has a force transmission surface 54 situated at the front in the assembly direction 6. The surface 54 is curved or bent in the direction of the latching elements 28, 29.

The surface 54 is provided for applying a force acting in the assembly direction on the latching elements 28, 29 or on the force transmission surfaces 30, 31 thereof in order to transfer the pin device 3 from the intermediate assembly position 52 into a final assembly position 39.

In the text which follows there will be described a method for introducing the fastening apparatus into a component opening 5 in a carrier component 4 or for transferring it from a transport/preassembly position 55 via an intermediate assembly position 52 into a final assembly position 39 (FIGS. 5 to 10).

First of all, the fastening apparatus 1 is introduced in the assembly direction 6 into a component opening 5 in a carrier component 4 in such a way that the fastening portion 8 of the housing device 2 is arranged in the component opening 5.

The force is transmitted by a user to the fastening apparatus 1 by applying a force acting in the assembly direction 6 to the pin device 3, in particular to the verification element 38 of the pin device 3.

In the transport/preassembly position 55, the pin device 3 is substantially arranged in the receiving recess 35 of the housing device 2, wherein the preassembly latching means 42 of the verification element 38 engage behind the latching edges 17, 18 of the latching cutouts 15, 16 of the verification portion 7. In this way, the pin device 3 is securely and reliably held in the housing device 2 such that the pin device 3 and the housing device 2 are securely and reliably connected to one another during transport and an ever the same starting position is ensured prior to mounting the fastening apparatus 1.

The force acting on the pin device 3 is transmitted via the pin arms 46, 47 and the corresponding pin latching means 48, 49 to the correspondingly formed housing latching means 36, 37 until the intermediate assembly position 52 has been reached.

While the fastening apparatus 1 is reaching the intermediate assembly position as a result of displacement in the assembly direction 6, the actuating elements 33, 34 contact an edge of the component opening 5 and are displaced ever further in the direction of the receiving recess 35 and in so doing also displace the pin arms 46, 47 ever further toward one another.

After reaching the intermediate assembly position 52, the pin arms 46, 47 are displaced transversely to the assembly direction and toward one another by means of the actuating elements 33, 34 to such an extent that the pin latching means 48, 49 are no longer in engagement with the housing latching means 36, 37.

Once the pin latching means 48, 49 are no longer in engagement with the housing latching means 36, 37, the apparatus 1 is no longer in the intermediate assembly position 52.

The force acting in the assembly direction 6 for introducing the fastening apparatus into the carrier component 4 then no longer occurs via the pin arms and the rigid portion of the housing device 2 in the receiving recess, in which portion the housing latching means 36, 37 are integrally formed, but rather the surface 54 of the pin element 53 transmits the force to the force transmission surfaces 30, 31 of the latching elements, which then also contact the edge of the component opening 5 and are thereby arranged virtually completely in the receiving recess 35.

The force transmission from the surface 54 of the pin element 53 to the force transmission surfaces 30, 31 of the latching elements occurs until such time as the final assembly position 39 has been reached.

When the fastening apparatus 1 has been completely inserted into the component opening 5 in the carrier component 4 in the assembly direction, the latching elements 28, 29 are no longer held or pressed inward by an edge of the component opening in the carrier component, but are swung outward transversely to the assembly direction by the application of a force component of the assembly force that acts outwardly, with the result that the latching elements 28, 29 engage behind the component opening 5 or latch behind the component opening.

To limit the movement of the pin element 53 in the assembly direction 6, the stop surface 45 of the stop element 44 of the pin device butts against the counter-stop surface 19 of the housing device 2 in the region of the verification portion 7.

At this moment, the latching wings 41 or their preassembly latching means 42 are also released from the latching cutouts 15, 16, and the final assembly latching means 43 of the latching wings 41 engage behind the latching edges 17, 18 of the latching cutouts 15, 16 in order to fix the pin device 3 in the final assembly position 39 in the housing device 2. Upon reaching the final assembly position, when the latching wings are latched and the stop surface 45 butts against the counter-stop surface 19, the verification surface 40 of the verification element is arranged in the receiving recess in the region of the verification portion 7 in such a way that the edges of the side wall 9, 10, 11, 12 that are situated counter to the assembly direction terminate areally flush with the verification surface 40, with the result that the latter has been received completely in the verification portion 7 of the housing device 2.

LIST OF REFERENCE SIGNS

1 Fastening apparatus
2 Housing device
3 Pin device
4 Carrier component
5 Component opening
6 Assembly direction
7 Verification portion
8 Fastening portion
9 Side wall
10 Side wall
11 Side wall
12 Side wall 13 Bottom wall
14 Receiving opening
15 Latching cutout
16 Latching cutout
17 Latching edge
18 Latching edge
19 Counter-stop surface
20 Fastening surface
21 Spring element
22 Side wall
23 Side wall
24 Side wall
25 Side wall
26 Bottom wall
27 Latching region
28 Latching element
29 Latching element
30 Latching/force transmission surface
31 Latching/force transmission surface
32 Actuating region
33 Actuating element
34 Actuating element
35 Receiving recess
36 Housing latching means
37 Housing latching means
38 Verification element
39 Final assembly position
40 Verification surface
41 Latching wing
42 Preassembly latching means
43 Final assembly latching means
44 Stop element
45 Stop surface
46 Pin arm
47 Pin arm
48 Pin latching means
49 Pin latching means
50
51
52 Intermediate assembly position
53 Pin element
54 Force transmission surface
55 Transport/preassembly position

What is claimed is:

1. A fastening apparatus for fastening a component to a carrier component, comprising
a housing device having a receiving recess, at least one actuating element and at least one latching element for latching in the carrier component, and
a pin device which can be arranged so as to be displaceable in the receiving recess of the housing device in an assembly direction and which has at least one movable pin arm with a pin latching means for transmitting an assembly force, which acts in the assembly direction, to a rigid housing latching means which is integrally formed on the housing device, in order to arrange the fastening apparatus in an intermediate assembly position, wherein the housing latching means is formed in a corresponding manner to the pin latching means, and wherein the actuating element is designed to actuate the at least one pin arm.

2. The fastening apparatus as claimed in claim 1,
wherein the pin device has a rigid pin element, wherein the pin element has a surface which is situated at a front in the assembly direction and which is designed to transmit a force, which acts in the assembly direction, to the at least one latching element of the housing device in order to arrange the fastening apparatus in a final assembly position.

3. The fastening apparatus as claimed in claim 1,
wherein the at least one actuating element comprises two actuating elements and the at least one latching element comprises two latching elements,
wherein, in each case, the two actuating elements and the two latching elements are formed on the housing device and are arranged on adjacent side walls of the housing device such that the two actuating elements are situated opposite one another and are arranged offset with respect to one another in the assembly direction and the two latching elements are arranged at the front in the assembly direction and the two actuating elements are arranged behind the two latching elements in the assembly direction.

4. The fastening apparatus as claimed in claim 3,
wherein, in a final assembly position, the pin element is arranged between the latching elements such that a movement of the latching elements is blocked in the final assembly position, with a result that the fastening apparatus is secured in the final assembly position.

5. The fastening apparatus as claimed in claim 1,
wherein a verification portion which extends transversely to the assembly direction is provided at an end of the pin device situated counter to the assembly direction and, in a final assembly position, can be arranged completely, areally flush, in the receiving recess of the housing device.

6. The fastening apparatus as claimed in claim 5,
wherein latching wings having at least one and two preassembly latching means and/or at least one and two final assembly latching means are provided on the verification portion, wherein the preassembly latching means fix the housing device and the pin device in a preassembly position relative to one another and/or the final assembly latching means fix the housing device and the pin device in the final assembly position relative to one another.

7. The fastening apparatus as claimed in claim 1,
wherein a stop element having a stop surface for limiting a displacement of the pin device in the receiving recess of the housing device in the assembly direction is formed on the pin device, wherein a corresponding counter-stop surface is formed on the housing device.

8. The fastening apparatus as claimed in claim 1,
wherein the housing device and the pin device are formed from a plastic.

9. The fastening apparatus as claimed in claim 1,
wherein the housing device has a fastening surface which extends transversely to the assembly direction in order to fix a fastening portion of a component to be fastened between the fastening surface and a surface, which extends parallel to the fastening surface, of a carrier component.

10. The fastening apparatus as claimed in claim 9,
wherein at least one spring element is provided in a region of the fastening surface in order to apply a spring force acting in the assembly direction to the component, which is to be fastened, in a final assembly position.

11. A fastening apparatus for fastening a component to a carrier component, comprising
a housing device having a receiving recess, at least one actuating element and at least one latching element for latching in the carrier component, and a pin device configured to be arranged so as to be displaceable in the receiving recess of the housing device in an assembly direction and which has at least one movable pin arm with a pin latch for transmitting an assembly force, which acts in the assembly direction, to a rigid housing latch which is integrally formed on the housing device, in order to arrange the fastening apparatus in an intermediate assembly position, wherein the housing latch is formed in a corresponding manner to the pin latch, and wherein the actuating element is configured to actuate the at least one pin arm.

* * * * *